United States Patent [19]

Zimmerman

[11] Patent Number: 4,699,746

[45] Date of Patent: Oct. 13, 1987

[54] PROCESS OF MAKING HIGH TENACITY AS-SPUN ANISOTROPIC MELT FIBERS

[75] Inventor: Joseph Zimmerman, Greenville, Del.

[73] Assignee: E. I. Du Pont de Nemours and Company, Wilmington, Del.

[21] Appl. No.: 775,367

[22] Filed: Sep. 12, 1985

[51] Int. Cl.$^4$ .................. C08G 63/18; D01D 5/10
[52] U.S. Cl. .................. 264/211.15; 264/211.14; 264/211.17; 528/190
[58] Field of Search ......... 264/176 F, 211.14, 211.17, 264/211.15; 528/190

[56] References Cited

U.S. PATENT DOCUMENTS

| | | | |
|---|---|---|---|
| 4,118,372 | 10/1978 | Schaefgen | 528/190 |
| 4,159,365 | 6/1979 | Payet | 428/364 |
| 4,242,496 | 12/1980 | Jackson, Jr. et al. | 528/190 |
| 4,529,565 | 7/1985 | Kasatani et al. | 528/190 X |

FOREIGN PATENT DOCUMENTS 54-13969 8/1979 Japan.
58-91812 5/1983 Japan.

*Primary Examiner*—Jeffery Thurlow
*Assistant Examiner*—Leo B. Tentoni

[57] ABSTRACT

As-spun fibers of high tenacity are obtained by melt-spinning certain high inherent viscosity copolyesters through spinneret orifices of about 6 mils and less.

6 Claims, No Drawings

PROCESS OF MAKING HIGH TENACITY AS-SPUN ANISOTROPIC MELT FIBERS

BACKGROUND OF THE INVENTION

Fully aromatic polyesters characterized by formation of anisotropic melts have been disclosed in a number of patents. These polyesters are generally spun at moderate molecular weight to form oriented fibers of low to moderate tensile strength. Subsequently, these as-spun fibers can be subjected to heat-treatment as a result of which they strengthen significantly. Aside from the expense associated with such heat-treatment, there is a tendency for filament sticking which must be carefully controlled. When attempts are made to spin higher molecular weight polymers of this class, poor properties and nonuniform fiber, e.g. excessive diameter fluctuations along the length of the filaments are encountered. In U.S. Pat. No. 4,612,154, a method for eliminating these fluctuations by proper polymer selection and processing techniques is described. The present invention permits the attainment of higher tensile strengths in as-spun fiber than can be attained with prior art processes.

U.S. Pat. No. 4,159,365 discloses optically anisotropic melt-forming polyesters and fibers based on phenylhydroquinone terephthalate containing 0–10 mol % (based on total mols of units) of other aromatic or cycloaliphatic polyester forming units. One of the polymers exemplified contains 8.1 mol % (as defined above) of p-hydroxy benzoic acid units and is polymerized to an inherent viscosity, $\eta_{inh}$, of 2.12. The as-spun fiber exhibited a tensile strength of 6.1 grams per denier (gpd). Heat strengthening was required to obtain high strength yarns.

SUMMARY OF THE INVENTION

This invention involves melt-spinning, through spinneret orifices having a diameter equal to or less than about 6 mils, an optically anisotropic melt-forming copolyester having an $\eta_{inh}$ of at least 3.5 as measured at a concentration of 0.5 g of polymer per 100 ml. hexafluoroisopropanol/chloroform (50/50 v/v) or if not readily soluble therein, then having an $\eta_{inh}$ of at least 4.5 as measured at a concentration of 0.1 g of polymer per 100 ml pentafluorophenol and consisting essentially of recurring units of the formula

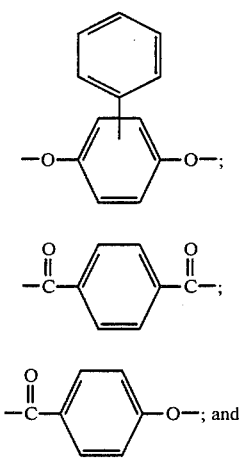

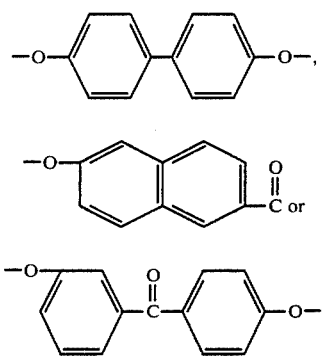

with units I & II each constituting at least about 40 mol % (based on total mols of units), unit III constituting from about 2.5 to 12 mol % (as defined above) and unit IV, if present, constituting from 0 to 7.5 mol % (as defined above) with the proviso that the total number of carbonyl groups in the copolyester is substantially equal to the number of hydroxyl groups. With these compositions and technology as-spun filament tensile strengths as high as about 20 gpd have been achieved.

DETAILED DESCRIPTION OF THE INVENTION

The polymers employed in this invention are prepared by starting with standard melt polymerization procedures in which, for example, the diacetates of the diols are reacted with the desired diacids and the acetate of p-hydroxy acid. At the start of polymerization it is customary to operate at atmospheric pressure or with a slight vacuum in an oxygen-free atmosphere. Then the pressure is gradually reduced (e.g., down to 5 mm Hg or less) until the inherent viscosity (measured at a 0.5% solution) is 0.5 or higher. The polymer is then isolated and pulverized and subjected to solid phase polymerization (SPP). Final SPP temperatures should be approached gradually to permit crystallization and some polymerization to occur at lower temperatures which then reduces sticking propensity at the final temperatures. Alternatively, the polymer can be polymerized to high $\eta_{inh}$ in a suitable melt polymerizer.

The high $\eta_{inh}$ polymer is melted thoroughly at temperatures above the Differential Scanning Calorimeter (DSC) melting range and spun. To control thermal degradation in the melt to acceptable levels, melts should not be kept at temperatures above about 350° C. for any significant period of time and preferably not above about 330° C.

When the polymers of this invention are melt extruded as described above through spinneret capillaries equal to or less than about 6 mil diameter, they yield very high strength as-spun fibers, e.g., above about 12 gpd. Moreover, these fibers can be heat strengthened relatively rapidly to give still higher strengths since they are less prone to filament sticking than typical low $\eta_{inh}$ fibers.

MEASUREMENTS

Inherent viscosity ($\eta_{inh}$) is determined (except where otherwise stated) at a concentration of 0.5 g of polymer in 100 ml of solvent (1,1,1,3,3,3-hexafluoroisopropanol/chloroform (50/50, vol/vol). In some cases, where the polyesters are not readily soluble in this solvent, $\eta_{inh}$ is measured in pentafluorophenol (PFP) at a concentration of 0.1 g of polymer in 100 ml of solvent. For a given polymer, the latter method usually gives a higher valve than the former. Viscosity measurements are made on fiber rather than on lumps of polymer because the latter do not dissolve as rapidly.

Tensile properties are determined on a conventional "Instron" Tensile Tester on 2.5 cm single filaments. D stands for denier, T is tenacity in gpd, M is modulus in gpd and E is elongation in percent. DSC curves are obtained in a Du Pont 1090 Differential Scanning Calorimeter with a 20° C./min heating rate.

It should be recognized that as-spun filaments of lower strength than reported herein have at times been obtained. However, it is believed that the examples which follow are truly representative of the capabilities of the present invention.

EXAMPLE 1

An aromatic polyester is prepared by combining in a 1000 ml 3-neck, round bottom flask 119 g of phenylhydroquinone (PHQ) diacetate (4 mole % excess), 70.55 g of terephthalic acid (T), 13.5 g of the acetate of p-acetoxy benzoic acid (HBA) and 0.040 g of sodium acetate as a catalyst. The flask is equipped with a stirrer, nitrogen inlet port, distillation head and a collection vessel. The reaction vessel is evacuated and purged with nitrogen five times and place in a Woods metal bath at 310° C. while under a slight vacuum. When most of the mixture is molten (except for some terephthalic acid), the stirrer is turned on at 30 revolutions per minute. After the acetic acid byproduct collects in the receiving flask for about 15 minutes, the temperature is gradually increased to 335° C. and the pressure gradually reduced to ~0.25 mm of mercury over a period of about 45 minutes and held there for six minutes. The vacuum is then released, the polymer blanketed with nitrogen and the polymerization flask removed from the heating bath. Polymer $\eta_{inh}$ is about 1.57.

The polymer is crushed, ground to a powder and then subjected to solid phase polymerization in a vacuum oven at a pressure of 1.1–2.2 mm of mercury. Oven temperature is increased from 152° C. to about 280° C. over a period of about 8 hours and then is maintained at 280° C. for about 22 hours. The polymer is then melted and prefiltered through a screen pack at a temperature of 348° C., collected and respun at a melt temperature of about 349° C., and extruded through a 5 mil spinneret whose temperature is maintained at 354° C. Uniform, lustrous filaments with tensile properties (D/T/M/E) of 26.5/18.8/440/5.0 are obtained at 12 meters/min wind-up speed. Fiber $\eta_{inh}$ is about 6.25. The DSC peak melting temperature of the solid phase polymerized polymer is 291° C. The composition in mol percent, is PHQ/T/HBA=46/46/8.1 where PHQ is the unit from phenylhydroquinone, T is the unit from terephthalic acid and HBA is the unit from p-hydroxybenzoic acid.

EXAMPLE 2

A polymer of composition PHQ/T/HBA in mol percent (44.45/44.45/11.1) is made in a manner similar to the procedure in Example 1. The polymer $\eta_{inh}$ is about 1.8. After solid phase polymerization at 276°–282° C. for about 23 hours (plus about 8 hours of warm-up), the polymer is prefiltered and spun through a 5 mil capillary. Melt temperature is about 347° C. and spinneret temperature is 356° C. Fibers are obtained at a wind-up speed of about 15 m/min with filament tensile properties (D/T/M/E) of 35/15.8/390/4.7. Fiber $\eta_{inh}$ is 5.7 and the DSC peak melting point of the solid phase polymerized polymer is about 288° C.

EXAMPLE 3

A polymer of composition PHQ/T/HBA in mol percent (48.7/48.7/2.6) is prepared in a manner similar to Example 1 but using only 2 mol % excess phenylhydroquinone diacetate and including 3 mol % benzoic anhydride. The polymer having an $\eta_{inh}$ of 1.6 was solid phase polymerized at 300° C. (max) for about 5 hours (following about 3 hours of warm-up), prefiltered, melted at about 338° C., and spun through a spinneret at 354° C. While uniform filaments are collected at about 230 m/min fiber tenacity is only 9.3 gpd at 2.8% elongation (denier=37). Fiber $\eta_{inh}$ is about 3.8 and DSC peak melting point of the solid phase polymerized polymer is 324° C. On further solid phase polymerization of this polymer, fibers having a $\eta_{inh}$ of 5.0 are spun through a 5 mil diameter spinneret maintained at 344° C. and collected at about 134 m/min. Filament tensile properties (D/T/M/E) are 9.1/13.1/389/3.8.

EXAMPLE 4

A polymer is prepared in the melt as in Example 1 from acetic acid esters of phenylhydroquinone, p-hydroxybenzoic acid and 1,4-dihydroxybiphenyl (DHB) and terephthalic acid. The polymer having a $\eta_{inh}$ of about 2.3 was solid phase polymerized in a vacuum oven at a temperature of about 274° C. under a pressure of about 1.4–1.7 mm of mercury for about 27 hours, following a warm-up period of about 5 hours. The polymer is then prefiltered through a screen pack at a melt temperature of about 330° C., collected, remelted at about 319° C. and spun through a spinneret with a 5 mil capillary. Spinneret temperature is 324° C. Fiber collected at a wind-up speed of 28 m/min had filament properties (D/T/M/E) of 10.9/20.1/462/5.2. Fiber $\eta_{inh}$ is about 9.3 (0.1% in PFP). The polymer composition PHQ/DHB/T/HBA in mol percent is 42.1/5.25/47.4/5.25. DSC peak melting point of the solid phase polymerized polymer is 288° C.

EXAMPLE 5

A polymer of composition PHQ/DHB/T/HBA in mol percent (43.2/2.7/46.0/8.1) is made from the corresponding acetates and acids as in Example 4. The melt polymer, having a $\eta_{inh}$ of 1.9 is solid phase polymerized, prefiltered, melted at 321° C. and spun through a 5 mil spinneret maintained at about 342° C. Filaments (13.8 denier) of about 7.6 $\eta_{inh}$, collected at about 28 m/min, have a tensile strength of 15.9 gpd at 5.1% elongation. DSC peak melting point of the solid phase polymerized copolymer is about 286° C. Polymer that is polymerized to a somewhat greater extent and spun with a 337° C. spinneret at 27 m/min gives fibers with filament tensile properties (D/T/M/E) of 11.5/17.5/403/4.9. Fiber $\eta_{inh}$ is about 9.7 (0.1% in PFP).

EXAMPLE 6

A polymer of composition PHQ/T/HBA/HNA in mol percent (45.05/45.05/8.25/1.65) is prepared using the procedure of Example 1 from the corresponding acetates and acids at 330° C. maximum bath temperature, HNA represents units from 2,6-hydroxynaphthoic acid. The polymer of $\eta_{inh}$ of about 1.7 is solid phase polymerized at 280° C. for about 24 hours (following about a 7 hour warm-up), prefiltered, melted at about 314° C. and spun from a 5 mil capillary spinneret at 332° C. Filaments are collected at about 112 m/min. They have $\eta_{inh}$ of about 5.7 and tensile properties (D/T/M/E) of 9.4/15.0/412/4.3. The peak DSC melting point of the solid phase polymerized polymer is about 283° C. Polymer, solid phase polymerized to a greater extent and spun with a 330° C. spinneret is collected at about 18 m/min to give filaments having a $\eta_{inh}$ of about 6.3 and tensile properties (D/T/M/E) of 18.2/15.9/395/4.6.

EXAMPLE 7

This examples illustrates the fact that the high molecular weight fibers of this invention are excellent candidates for further heat strengthening with low filament sticking propensity.

A high $\eta_{inh}$ fiber from a polymer composition PHQ/T/HBA (47.4/47.4/5.26) with 16 gpd tenacity is heated according to the following cycle: warm-up to 280° C.—11 min, 280° C. to 286° C.—17 min, 286° to 290° C.—10 min, 290° to 300° C.—16 min, hold at 300° C.—10 min, cool. The resulting filament tenacity is 21 gpd at a break elongation of 5.5%. Another fiber spun from this polymer with a 15 gpd tenacity is heated at about 300° C. for 3 hr (after a staged warm-up—30 min to 290° C., 22 min at 290°-295° C.) which gives a 25 gpd tenacity at a break elongation of 7%.

What is claimed is:

1. In a process for preparing high tenacity as-spun fibers wherein an optically anisotropic melt-forming copolyester consisting essentially of recurring units of the formula

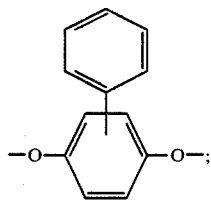 I

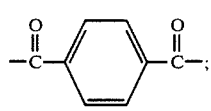 II

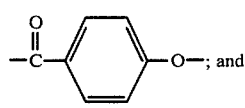 III

-continued

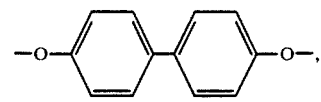 IV

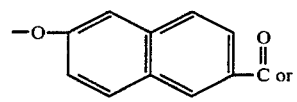

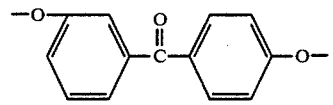

with units I and II each constituting at least about 40 mol %, unit III constituting from about 2.5 to 12 mol % and unit IV, if present, constituting from 0 to 7.5 mol % with the proviso that the total number of carbonyl groups in the copolyester is substantially equal to the number of hydroxyl groups is melt-spun, the improvement comprising melt-spinning a copolyester having an inherent viscosity, $\eta_{inh}$, of at least 3.5 as measured at a concentration of 0.5 g of polymer per 100 ml hexafluoroisopropanol chloroform (50/50 v/v) or, if not readily soluble therein, then having an $\eta_{inh}$ of at least 4.5 as measured at a concentration of 0.1 g of polymer per 100 ml of pentafluorophenol through a spinneret orifice having a diameter equal to or less than about 6 mils, to produce an as-spun fiber of tenacity above about 12 grams per denier.

2. The process of claim 1 wherein the copolyester consists essentially of units I, II and III.

3. The process of claim 1 wherein the as-spun filament is heat-strengthened.

4. The process of claim 1 wherein unit IV is

5. The process of claim 1 wherein unit IV is

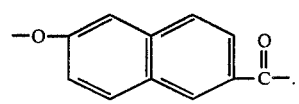

6. The process of claim 1 wherein unit IV is

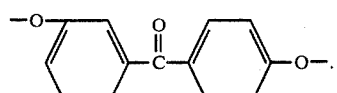

* * * * *